United States Patent [19]

Mundus et al.

[11] 4,198,260
[45] Apr. 15, 1980

[54] APPARATUS FOR SEVERING A STACK OF FILMLIKE SECTIONS AND SIMULTANEOUSLY FORMING THEM INTO BLOCKS

[75] Inventors: Friedhelm Mundus; Helmut Simon, both of Lengerich of Westphalia, Fed. Rep. of Germany

[73] Assignee: Windmoller & Holscher, Lengerich of Westphalia, Fed. Rep. of Germany

[21] Appl. No.: 876,160

[22] Filed: Feb. 8, 1978

[30] Foreign Application Priority Data

Mar. 1, 1977 [DE] Fed. Rep. of Germany ....... 2708853

[51] Int. Cl.² .................. B31B 19/14; B31B 19/60
[52] U.S. Cl. .................. 156/515; 93/33 H; 93/DIG. 1; 156/362; 156/539
[58] Field of Search .............. 156/515, 499, 510, 539, 156/583.5, 362; 93/33 H, DIG. 1, 8 R; 83/171

[56] References Cited

U.S. PATENT DOCUMENTS

| | | | |
|---|---|---|---|
| 3,420,727 | 1/1969 | Beck | 156/515 |
| 3,917,505 | 11/1975 | Schulze | 156/515 |
| 3,992,981 | 11/1976 | Stock | 156/515 X |

FOREIGN PATENT DOCUMENTS

788969 7/1968 Canada ...................................... 156/515
2302477 7/1975 Fed. Rep. of Germany .

*Primary Examiner*—Michael G. Wityshyn
*Attorney, Agent, or Firm*—Fleit & Jacobson

[57] ABSTRACT

A stacking, severing and block-forming machine for sheet articles such as flattened plastics bags comprises a stacking station at which the articles are superposed against a displaceable abutment, a mechanism for compressing each stack, a conveyor mechanism for taking each stack to a severing and block-forming station when the abutment has been displaced and a heatable knife for cutting through the stack and simultaneously interconnecting the cut edges of the articles to form blocks. The compressing mechanism is at a stationary location downstream of the stacking station and the knife is displaceable in the upstream direction during cutting.

17 Claims, 4 Drawing Figures

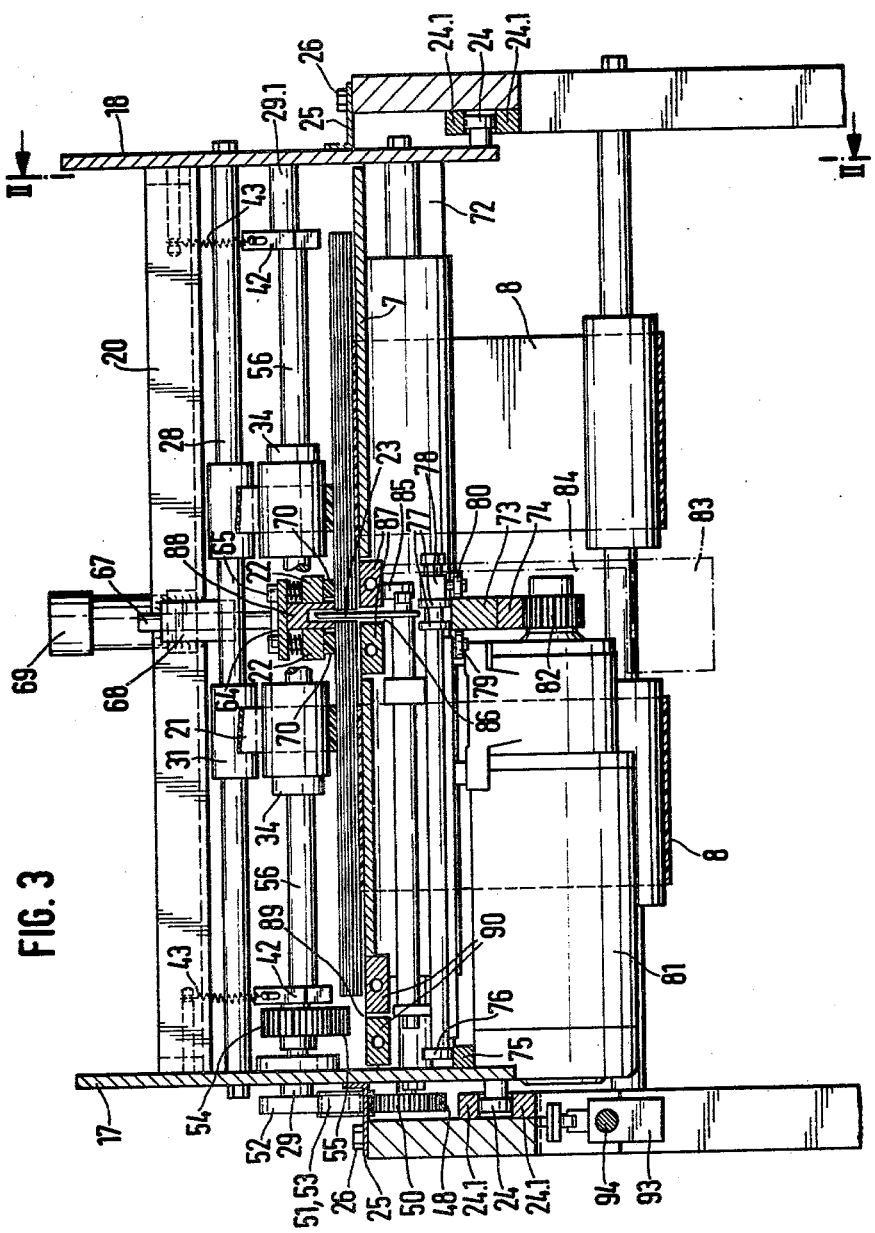

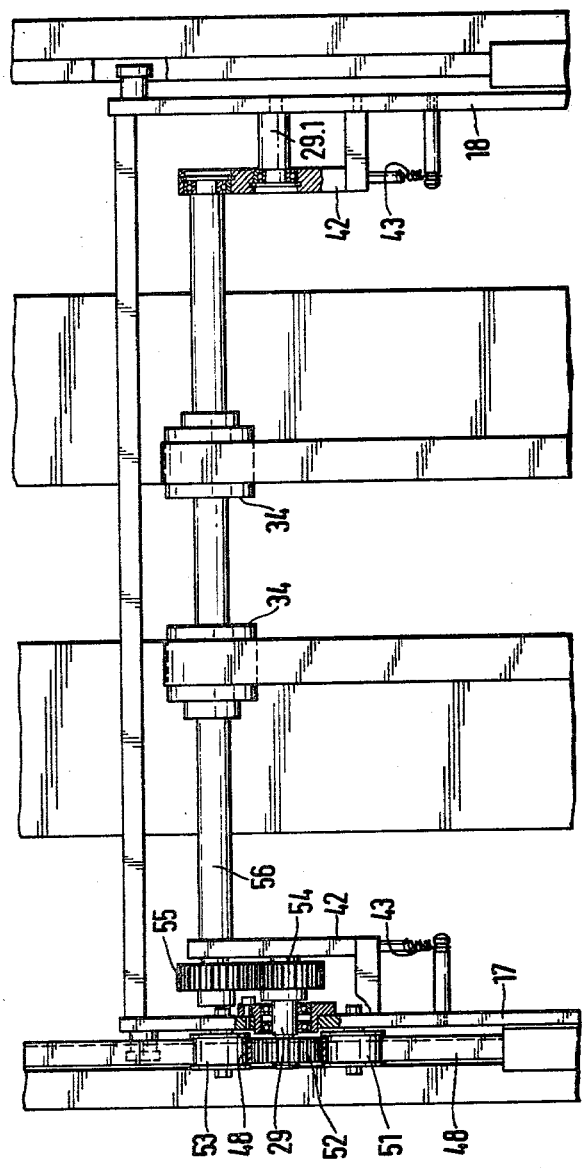

APPARATUS FOR SEVERING A STACK OF FILMLIKE SECTIONS AND SIMULTANEOUSLY FORMING THEM INTO BLOCKS

The invention relates to an apparatus for severing a stack of film-like sections such as plastics bags or the like and simultaneously forming them into blocks, comprising stacking means having a movable abutment, means for conveying each stack away and compressing it between pressure jaws, and a heated knife movable relatively to the compressed stack for severing same and interconnecting the sections at their cut edges.

In an apparatus of this kind known from DT-AS 23 02 477, stacking of the individually supplied sections takes place in a stacking station which is bounded by lateral abutments and into which the pressing means arranged on a reciprocatable carriage can be moved. After reaching the desired stacking height, the pressing means take over the formed stack in that pressure jaws are lowered on both sides of the centre line of the stack which is resting on a longitudinally divided support. In front of the stacking station as viewed in the conveying direction, the heated knife is arranged at a fixed location with respect to the frame. The knife is passed by the carriage in a manner such that the stack which is held together by the pressing means arranged on the carriage is centrally severed and formed into blocks at the cut edges. After raising the pressure jaws, the blocks of half-stacks are taken away by throughgoing conveyor belts whilst the carriage with the pressure means returns to the stacking station.

In the known apparatus, while the compressed stack is being moved out of the stacking station, no subsequent workpieces can be accumulated in the stacking station because the latter is blocked by the only partially displaced compressed stack and therefore proper depositing is impossible. Since the heated knife can be passed by the movable pressure means at only a moderate severing speed, the stacking station is blocked for a period which makes it necessary to bring the production machine for the individually supplied sections to a standstill or to provide complicated equipment for restraining or temporarily storing the continuously supplied sections.

In the known apparatus, the output cannot be increased by raising the temperature of the heated knife and thereby increasing the severing speed. The temperature of the knife is limited by the temperature that would lead to burning of the sections to be formed into blocks. Even with a permissible temperature for the knife, the advancing speed cannot be increased at will because this would reduce the quality of forming the severed edges of the stack into blocks.

It is the problem of the present invention to improve the known apparatus in such a way that its output is increased without the need for increasing the traversing speed of the knife which severs the stack and forms the severed edges into blocks.

This problem is solved according to the invention in that the compressing means are fixed with respect to the frame behind the stacking means as viewed in the conveying direction and the heated knife is displaceable against the conveying direction in and for executing the block-forming cut. In the apparatus according to the invention the stack accumulated in the stacking station is, after release by the front abutment, moved by the throughgoing conveying belts out of the stacking station into the pressing station and subsequently the abutment closing the stacking station is immediately returned to its accumulating position. In the apparatus according to the invention each stack that is formed is moved out of the stacking station at the usual speed employed at the stacking station and this is not limited by the slow block-forming cut so that the supply of the individual sections to the stacking station need be delayed for only a short period, it being possible to effect this with the conventional means used at the stacking station without interrupting the continuous production of the sections.

After conveying the stack out of the stacking station, the pressure dies of the apparatus according to the invention are lowered onto the stack, the latter is compressed and the heated knife is moved through the pressing station against the conveying direction, so that the stack held between the pressure jaws is severed and the edges of the sections of the flat stack thus formed facing the knife can be interconnected by welding. After block formation of the cut edges, the pressure dies open. As soon as the next stack has been formed in the stacking station from the pre-selected number of sections, the conveyor belts recommence to move and transport the new stack to the pressing station and the blocks of stacks to the delivery station. At the same time the heated knife is advanced in the conveying direction until it has reached the starting position provided for the next block-forming cut. During block formation, workpieces are continuously accumulated in the stacking station so that the machine making the workpieces can continue its production without interruption and the output of the entire installation is increased.

Advantageous embodiments of the apparatus according to the invention are described in more detail in the subsidiary claims.

An example of the invention will now be described in more detail with reference to the drawing, wherein:

FIG. 3 is a section through the apparatus on the line III—III in FIG. 2, and

FIG. 4 is a plan view of the rear portion of the pressing station of the apparatus in the direction of the arrow X in FIG. 2.

Figure 1:
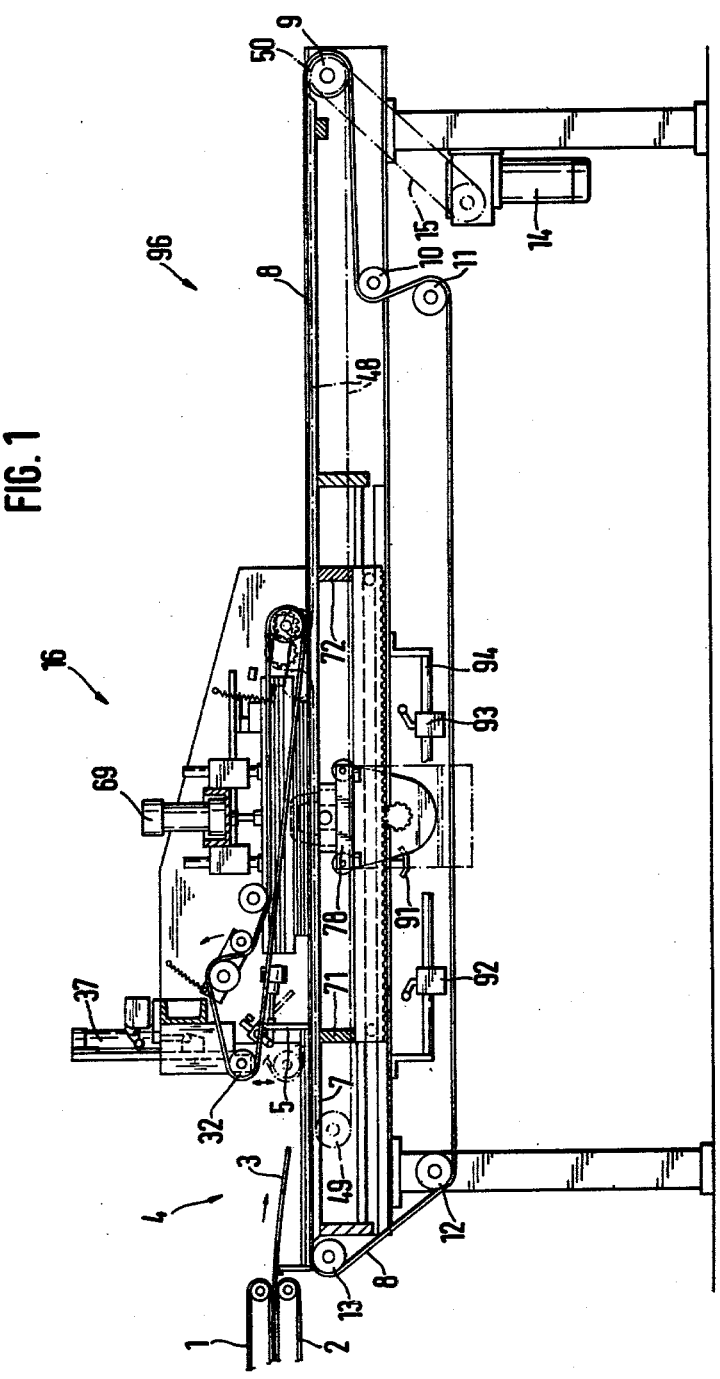
FIG. 1 is a diagrammatic side elevation of the stack and block-forming apparatus.
Figure 2:
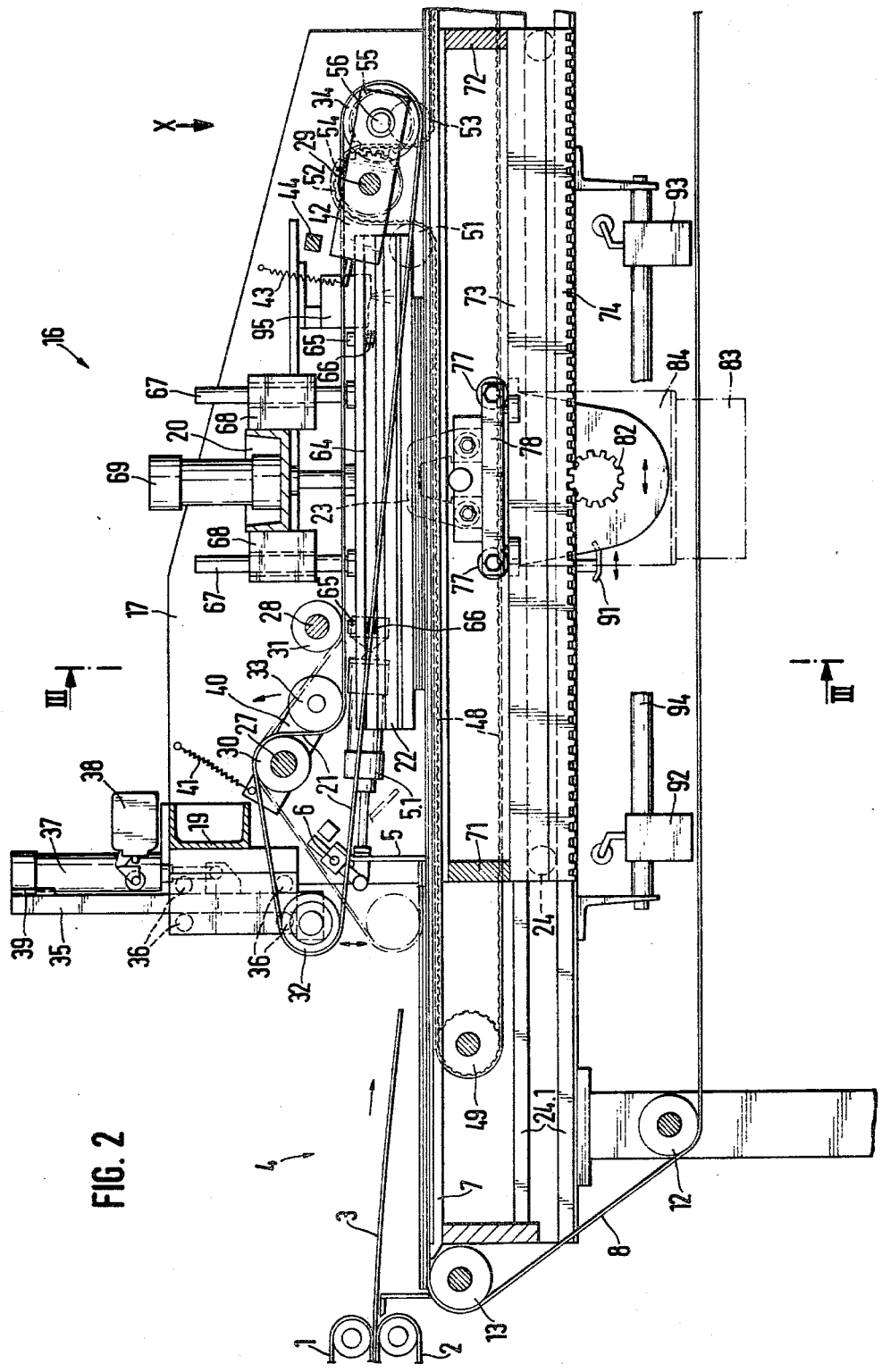
FIG. 2 is an enlarged section of the FIG. 1 apparatus or a section of the line II—II in FIG. 3.

Film-like sections 3 such as plastics bags or the like coming from a production machine (not shown) are fed by conveyor belts 1, 2 to a stacking station 4 of the apparatus. Running on a table 7 of the apparatus that also forms the base of the stacking station 4 there are two laterally spaced conveyor belts 8 which are guided over guide rollers 9 to 13 of which the guide roller 9 is driven by a motor 14 by way of a belt 15. In the conveying direction, the stacking station 4 is bounded by an abutment 5 which is connected to a rotatable shaft 6 and can be swung by a pressure medium cylinder 5.1 through about 90° out of the illustrated vertical position into a releasing position. Adjoining the stacking station 4 there is a pressing and block-forming station 16 which consists essentially of side walls 17, 18 with cross-members 19, 20, upper conveyor belts 21, pressure beams 22 and a heated knife 23. The side walls 17, 18 are held by the cross-members 19, 20. At their lower ends there are loosely rotatably mounted rollers 24 which roll between guide bars 24.1 fixed to the frame of the apparatus. The pressing and block-forming station 16 can thus be readily displaced in and opposite to the direction of conveying. By means of angle irons 25 which are secured to the side walls 17, 18 and can be screwed to the frame by bolts 26, the pressing and block-forming station 16 can be secured against unintentional movement after having been displaced in or opposite to the direction of conveying.

Guide rollers 30, 31 are loosely rotatably mounted on shafts 27, 28 fixed to the side walls 17, 18. Apart from these guide rollers 30, 31 there are guide rollers 32 to 34 for the two adjacent conveyor belts 21. The two guide rollers 32 are juxtaposed and are loosely rotatably mounted on a carriage 35 which is vertically movably guided between loosely rotatable rollers 36 secured to the cross-member 19. The carriage 35 is fixed to the piston rod of a pressure-cylinder unit 37 by means of which the carriage 35 can be raised and lowered. A limiting switch 38 against which a cam 39 secured to the carriage 35 can run up serves as a signal generator for notifying the position assumed by the carriage 35 and thus the position of the guide rollers 32. The conveyor belts 21 are held under tension by means of the guide rollers 33. They are loosely rotatably mounted on two-armed levers 40 which can pivot about the shaft 27. The arms of the levers 40 remote from the guide rollers are connected to tension springs 41 of which the free ends are secured to the side walls 17, 18. The guide rollers 34 are loosely rotatably mounted on two-armed levers 42 which can pivot about a shaft 29 at the side of the side wall 17 and about a pin 29.1 secured to the side wall 18 at the side of that side wall. Connected to the other arms of the levers 42 there are tension springs 43 of which the free ends are secured to the side walls 17, 18. With the aid of an adjustable abutment 44 secured in the side walls 17, 18, one can freely select the spacing of the rollers 34 to the conveyor belts 8. By means of the tension springs 43 the conveyor belts 21 or the passing stack are pressed onto the conveyor belts 8. By lowering the guide rollers 32, the runs of the conveyor belts 21 passing thereabout are also pressed onto the conveyor belts 8 so that a stack conveyed out of the stacking station 4 into the pressing and block-forming station 16 is lightly compressed under the tension of the conveyor belts 21.

The conveyor belts 21 are driven by a toothed belt 48 which runs over pulleys 49, 50 of which the pulley 50 is seated on the shaft fixed to the guide roller 9 and the pulley 49 is loosely rotatably mounted on the frame of the apparatus. The toothed belt 48 is also passed over pulleys 51 to 53. The pulleys 51 and 53 are loosely rotatably mounted in the side wall 17 and ensure that the pulley 52 is enveloped by the toothed belt 48 over a large enveloping angle. The pulley 52 is fixed to the shaft 29 which is loosely rotatable in the side wall 17 and on which there is also secured a spur gear 54. A spur gear 55 secured on a shaft 56 is in mesh with the spur gear 54. The guide rollers 34 are fixed to the shaft 56.

The pressure beams 22 are disposed between the conveyor belts 21. Arranged on their upper side there is a guide bar 64 with holes for bolts 65 by which they are held, the bolts 65 being screwed into the pressure beams 22 in the nature of stay bolts. Compression springs 66 are disposed coaxially with the bolts 65 between the guide bar 64 and the pressure beams 22. At the top of the guide bar 64 there are secured pins 67 which are slidingly mounted for longitudinal displacement in the pin guide 68. The pin guides 68 are secured to the cross-member 20 to which a piston-cylinder unit 69 is also connected, of which the piston rod is screw-connected to the guide bar 64. By means of the pressure-cylinder unit 69, the pressure beams 22 can be lowered onto the stack conveyed into the pressing and block-forming station 16 by the conveyor belts 8 and the stack can be pressed against the table 7. The pressure beams 22 are covered at their underside by a layer 70 of foam material having resilient properties and protecting the stack from damage.

The side walls 17, 18 are interconnected beneath the table 7 by two cross-members 71, 72 to which a longitudinal beam 73 is secured at the centre between the side walls 17, 18. A rack 74 is provided at the underside of the longitudinal beam 73. Flush with the upper edge of the longitudinal beam 73, a bar 75 is secured to the side wall 17.

Running on the upper edges of the longitudinal beam 73 and the bar 75 there are the rollers 76, 77 of a carriage 78 to which rollers 79, 80 are also loosely rotatably secured, which latter rollers run on the side faces of the longitudinal beam 73. An electric motor 81 secured to the carriage 78 has a pinion 82 on its output shaft in engagement with the rack 74. A further roller 85 connected to the carriage 78 rolls along the underside of the table 7. The heatable knife 23 is fixed to the carriage 78 and its heating element is energised by a transformer 83 which is secured to a holder 84 connected to the carriage 78. The knife 23 passes through an elongate hole 86 in the table 7 and projects beyond the upper edge of the table. The elongate hole 86 is laterally bounded by bars 87 which have throughgoing holes that are traversed by cooling water so that the heat radiated by the heated knife 23 can be dissipated away from the table. Between the pressure beams 22 there is a bar 88 which has a central downwardly directed longitudinal groove, is mounted on the guide bar 64 and into which the knife 23 enters upon lowering of the pressure beams 22. The pressure beams 22 are thereby protected from becoming heated by the heat knife 23. The carriage 78 may be provided with a second heated knife for which a further groove 89 is provided in the table 7 and which, in the same way as the elongate hole 86, is laterally bounded by bars 90 traversed by cooling water.

A switching cam 91 disposed beneath the guide bars 24.1 and connected to the carriage 78 runs up against the cam rollers of limiting switches 92, 93 which are displaceably secured on a guide rod 94 fixed with respect to the frame. By means of the limiting switches 92, 93, the terminal positions of the carriage 78 are notified to an intermediate circuit (not shown).

The apparatus operates as follows:

By displacing the pressing and block-forming station 16 in the guide bars 24.1, the stacking station 4 is set to the length of the sections 3 coming from the production machine and the pressing and block-forming station 16 is fixed to the frame of the apparatus by tightening the bolts 26. After the accumulation of a predetermined number of sections 3, the guide rollers 32 are lowered onto the stack of sections by means of the piston-cylinder unit 37 and the abutment 5 is swung to the releasing position. The carriage 78 is disposed in its right-hand limiting position. The switching cam 91 has actuated the limiting switch 93 in this position. The arrival of the guide rollers 32 in the lower position is notified by the limiting switch 38. On the occurrence of this signal, the conveyor belts 8 and 21 start to move and convey the stack of sections beneath the pressure beams 22. Its correct position is detected by a reflection light barrier 95 provided on the cross-member 20, in that its beam is interrupted by the leading edge of the stack of sections and notified to the intermediate circuit. The abutment 5 is simultaneously swung to the blocking position and the motor 14 or conveyor belts 8 and 21 are brought to a halt.

The piston-cylinder unit 69 lowers the pressure beams 22 onto the stack of sections and compresses same. The electric motor 81 advancing the carriage 78 is then started so that the heated knife 23 is moved opposite to the conveying direction and severs the stack of sections and also forms the sides facing the knife 23 into a block. The arrival of the carriage 78 at its left-hand limiting position is signalled by the switch 92 whereby the piston-cylinder unit 69 is actuated and the pressure beams are lifted from the block-form stacks. After the appropriate number of sections 3 have again been accumulated at the abutment 5 or in the stacking station 4, the aforedescribed cycle is repeated. Simultaneously with starting of the belts 8 and 21, the motor 81 is turned in a direction opposite to the first direction so that the carriage 78 is moved in the conveying direction at the same speed as the conveyor belts 8, 21 simultaneously with removal of the block-form stacks and arrival of the new stack. The carriage 78 is brought to a standstill by the limiting switch 93. The stack that has been severed into two portions and formed into blocks is conveyed by the conveyor belts 8 to the part of the table 7 which is disposed behind the pressing and block-forming station 16 and serves as a delivery station 96 where it can be processed further or removed for packaging.

We claim:

1. Apparatus for severing a stack of film-like sections, such as plastic bags or the like, and simultaneously forming them into blocks, comprising: stacking means having a movable abutment; a pressing and block forming station having a frame, compressing means fixed with respect to the frame for compressing a stack, and a heated knife movable relative to the compressed stack for severing same to form sections and for interconnecting the sections at their cut edges; means for conveying each stack from said stacking means to said pressing and block forming station; and the heated knife being displaceable against the conveying direction to sever the compressed stack.

2. Apparatus according to claim 1, characterised in that the pressing and block forming station includes a pressing station having side walls, cross-members interconnecting the side walls, upper conveyor belts, and pressure beams, and the means for conveying includes an upper conveyor belt.

3. Apparatus according to claim 2, characterised in that the pressing station includes guide bars for guiding displacement of the pressing station for setting to the size of sections to be severed, and bolts for clamping the pressing station in a desired position.

4. Apparatus according to claim 2, characterised in that a reflective light barrier in the pressing station scans the stack conveyed beneath the pressure beams to control the means for conveying.

5. Apparatus according to claim 2, characterised in that guide rollers are provided for the upper conveyor belt.

6. Apparatus according to claim 5, characterised in that the means for conveying includes a lower conveyor belt, and the pressing and block forming station includes lowerable guide rollers, and a piston-cylinder unit for lowering the lowerable guide rollers towards and for pressing the lowerable guide rollers onto the lower conveyor belt.

7. Apparatus according to claim 5, characterised in that the means for conveying includes a lower conveyor belt, and the pressing station includes levers for pivotally mounting selected ones of the guide rollers, and a spring for pressing the pivotally mounted rollers onto the lower conveyor belt.

8. Apparatus according to claim 7, characterised in that the means for conveying includes drive means comprising toothed belts and a pulley having spur gears driven by the toothed belts, said drive means driving at least one of said upper conveyor belt and said selected guide rollers.

9. Apparatus according to claim 2, characterised in that a pressure cylinder unit having a guide bar presses the pressure beams onto the stack of sections.

10. Apparatus according to claim 9, characterised in that compression springs are disposed between the pressure beams and the guide bar.

11. Apparatus according to claim 2, characterised in that a longitudinal beam is fixed to selected ones of the cross-members and the pressing and block forming station includes a carriage having rollers movable on the beam.

12. Apparatus according to claim 11, characterised in that a switching cam on the carriage co-operates with limit switches.

13. Apparatus according to claim 11, characterised in that a pinion of an electric motor is connected to the carriage and the longitudinal beam includes a rack engaged by the pinion.

14. Apparatus according to claim 11, characterised in that the heated knife is connected to the carriage.

15. Apparatus according to claim 14, including a table and characterised in that the heated knife passes through a slot in the table.

16. Apparatus according to claim 15, characterised in that bars having holes for the flow of cooling water laterally bound the slot.

17. Apparatus according to claim 15, characterised in that the table contains a further slot for a further knife.

* * * * *